United States Patent
Marvin et al.

(12) United States Patent    (10) Patent No.: US 6,318,194 B1
     Marvin et al.               (45) Date of Patent:   *Nov. 20, 2001

(54) FURNACE TUBE INSPECTION APPARATUS

(75) Inventors: Mark H. Marvin, Tacoma; David H. Bothell, Summer, both of WA (US); Steven Robert Lalumandier, League City; John William Hoose, Spring, both of TX (US); Thomas J. Cowling, Kent, WA (US)

(73) Assignee: Praxair Technology, Inc., Danbury, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,209

(22) Filed: Mar. 25, 1998

(51) Int. Cl.$^7$ .................................................. G01M 19/00
(52) U.S. Cl. ...................... 73/865.8; 73/866.5; 73/40.5 R
(58) Field of Search ................ 73/865.8, 40.5 R, 73/40.5 A, 866.5

(56) References Cited

U.S. PATENT DOCUMENTS

| | | | |
|---|---|---|---|
| 3,603,264 | 9/1971 | Arx | 104/138 |
| 3,837,214 | * 9/1974 | Guest | 73/40.5 R |
| 4,050,384 | 9/1977 | Chapman | 104/138 |
| 4,228,593 | 10/1980 | Frank et al. | 33/178 |
| 4,303,884 | 12/1981 | Malick | 324/220 |
| 4,522,063 | * 6/1985 | Ver Nooy | 73/40.5 A |
| 4,601,204 | 7/1986 | Fournot et al. | 73/432 |
| 4,757,258 | 7/1988 | Kelly, Jr. et al. | 324/220 |
| 4,852,391 | 8/1989 | Ruch et al. | 73/40.5 |
| 4,958,128 | 9/1990 | Tomoyasu et al. | 324/559 |
| 5,398,560 | 3/1995 | Zollingger et al. | 73/865.8 |
| 5,770,800 | * 6/1998 | Jenkins et al. | 73/623 |

FOREIGN PATENT DOCUMENTS

| | | |
|---|---|---|
| 673740 | 6/1952 | (GB) . |
| 58042946-A | * 9/1981 | (JP) ................................. 73/40.5 A |

OTHER PUBLICATIONS

Presentation, API Inspection Subcom., Houston, TX (Oct., 1996).
Brochure, "InSpec Furnace Tube Inspection Service", UCISCO (Apr., 1997).
Jackson et al., "The Development and Exploitation of British Gas' Pipeline Inspection Technology", British Gas plc (1989).
Brochure, "Flawsonic", T. D. Williamson (1994).
Brochure, "Geopig", Nowsco (1994).
Brochure, "Turnkey Pipeline Services", Pipetronix (Undated).

* cited by examiner

*Primary Examiner*—Hezron Williams
*Assistant Examiner*—Michael Cygan
(74) *Attorney, Agent, or Firm*—Blake T. Biederman

(57) ABSTRACT

An apparatus for inspecting an conduit such as a furnace tube comprising at least first and second module shells, each shell having an axially contoured exterior, and a flexible, non-jointed intermodule connector joining the first and second shells. Preferably, each module has a length that is 1.0 to 2.4 times its outer diameter and the connector has a length that is 0.5 to 2.0 times the outer module diameter.

30 Claims, 5 Drawing Sheets

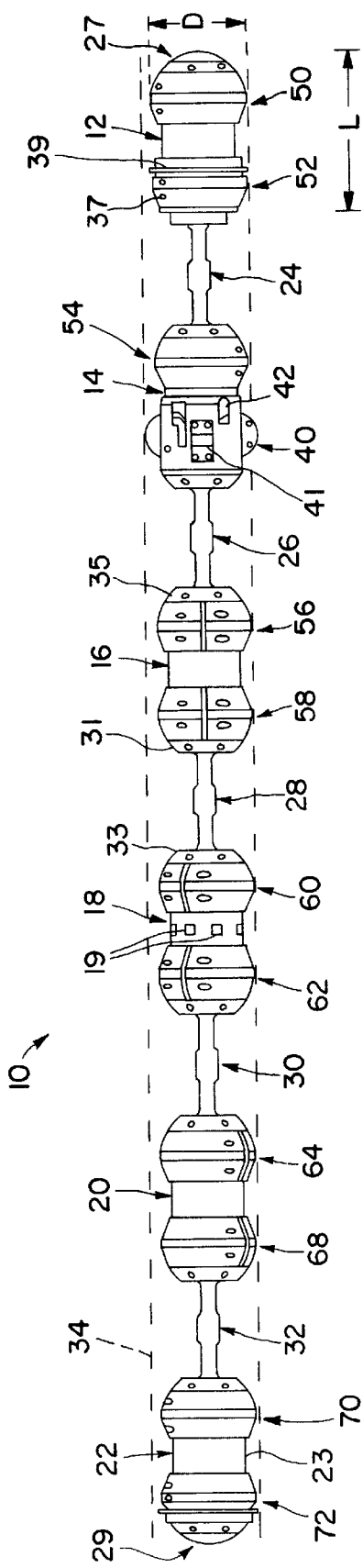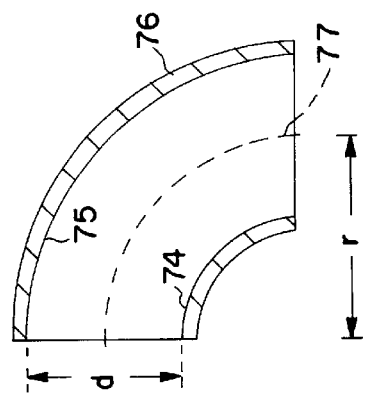
FIG. 1
FIG. 1A

FURNACE TUBE INSPECTION APPARATUS

FIELD OF THE INVENTION

This invention relates to an apparatus for inspecting conduits such as furnace tubes and more particularly to a plurality of modules linked by a flexible connector for traversing tight radius pipe bends.

BACKGROUND OF THE INVENTION

Certain furnaces, typically referred to as fired heaters, heat a hydrocarbon to a specific temperature to allow for a subsequent processing step. A fired heater includes a fire box, a stack, burners, radiant section tubes or pipes, and convective section tubes or pipes. The fire box is a refractory lined steel structure which contains the burners, radiant section tubes and convective section tubes. The stack is a steel conduit that carries the combustion gases out of the fire box to the atmosphere. The burners ignite a fuel and air mixture to generate the required heat.

The radiant section tubes line the inside wall of the fire box. These tubes are connected to each other with 180 degree return bends, resulting in a serpentine coil. In order to maximize the number of tubes that will fit into the firebox, these return bends typically have a radius equal to one tube diameter. The convective section tubes are located at the top of firebox below the stack. The combustion gases pass over these tubes as they exit the firebox and enter the stack. To maximize the transfer of heat out of the combustion gases and into the hydrocarbon the convective section tubes have extended surfaces on the outside surfaces. The convective section tubes usually are connected in the same manner as the radiant section tubes. However, the convective section tubes are arranged in a "stacked" manner, resulting in typically 3 to 5 rows of tubes staggered one row on top of the other.

Fired heaters employed in the oil refining and chemical industry experience elevated temperature and potentially corrosive conditions. These conditions result in deterioration of the tubes. If such deterioration goes undetected and uncorrected the tubes will rupture during operation. Such a rupture will result in the release of a hydrocarbon into the firebox. This release will result in a fire in the firebox and will require that the fired heater be shutdown for repair. This unscheduled shutdown can often result in the shutdown of an entire operating unit and in some cases an entire plant.

A method to easily and rapidly inspect the tubes in a fired heater would allow the operator to monitor tube deterioration and replace tubes before any such failure. Currently, most fired heaters are inspected during a shutdown by manually measuring the wall thickness of the tubes using an ultrasonic thickness gauge. The radiant section tubes typically are measured at several points along their lengths. These readings are recorded by an inspector. Some owners of fired heaters employ supplemental inspection techniques including x-ray and tube gauging.

Inspecting the tubes in a fired heater is difficult and time consuming. The entire tube set is enclosed in the firebox making access difficult. The radiant section tubes are accessible for limited manual inspection. This access usually requires the construction of scaffolding in the firebox. Constructing this scaffolding is both time consuming and costly. The close proximity of the radiant section tubes to the firebox wall limits any manual inspection to the tube surfaces not facing the wall. The manual nature of the inspection requires that in the interest of time and cost that the number of inspection points be limited. The convective section tubes are for the most part not accessible for manual inspection. The stacked configuration makes the center rows inaccessible. The extended surfaces on the outside of the convective tubes limits manual inspection to visual observations.

The extremely short radius of the return bends make the use of conventional pipeline inspection tools difficult or impossible for fired heater use. Additionally, the large number of return bends in a section of tubes makes the use of inspection tools with a connecting cable or tether impossible beyond a certain number of bends.

The problem with bends and cabled or tethered devices is described in U.S. Pat. No. 4,050,384 (Chapman) and may be referred to as the capstan effect. As the cable goes around a bend the frictional forces increase geometrically with each bend. After a few bends the cable drags and generates so much force that the cable would break.

U.S. Pat. No. 4,050,384 describes an approach to overcome the capstan effect by placing "traction units" along the cable. While this method will overcome the capstan effects it is plagued with the practical problems of introducing such an apparatus into a conduit system with a fluid.

U.S. Pat. No. 3,603,264 (Von Arx) describes a typical tethered inspection tractor. The problem with this system is the drag on the cable as it pass down the pipe. This device would have difficulty going up a vertical pipe. U.S. Pat. No. 4,601,204 (Fournot et al.) describes a self displacement tractor that is capable of running up a vertical pipe. One disadvantage of this type of device is that it is still tethered and therefore restricted in its length and ability to handle multiple bends. Another disadvantage is that the advance of these types of devices are usually quite slow and is measured in feet per minute not feet per second as would be desirable.

There are a number of conduit inspection devices that have short U-joint connections linking two or more modules. Other devices have a rigid shaft with a ball on each end that mate within module sockets such as disclosed in U.S. Pat. No. 4,852,391 (Ruch et al.). All of these devices have certain limitations, especially for negotiation of tight radius bends.

OBJECTS OF THE INVENTION

It is therefore an object of the invention to provide an improved furnace tube inspection apparatus which can easily negotiate tight radius bends in a pipe.

It is a further object of this invention to provide such an apparatus which can pass through bends having a radius of 1.5 or less of the pipe diameter.

Yet another object of this invention is to provide such an apparatus which is untethered and is driven by fluid pressure.

SUMMARY OF THE INVENTION

This invention comprises a conduit inspection apparatus comprising at least first and second module shells, each shell having an axially contoured exterior, and a flexible, non-jointed intermodule connector joining the first and second shells. In a preferred embodiment each module has a length that is 1.0 to 2.4 times its outer diameter and the connector tube has a length that is 0.5 to 2.0 times the outer module diameter.

BRIEF DESCRIPTION OF THE DRAWING(S)

Other objects, features and advantages will occur to those skilled in the art from the following description of a preferred embodiment and the accompanying drawings, in which:

FIG. 1 is a schematic diagram of an embodiment of the invention having six module shells joined by five connector;

FIG. 1A is a schematic drawing of a conduit bend;

DETAILED DESCRIPTION OF THE INVENTION

Figure 2A:
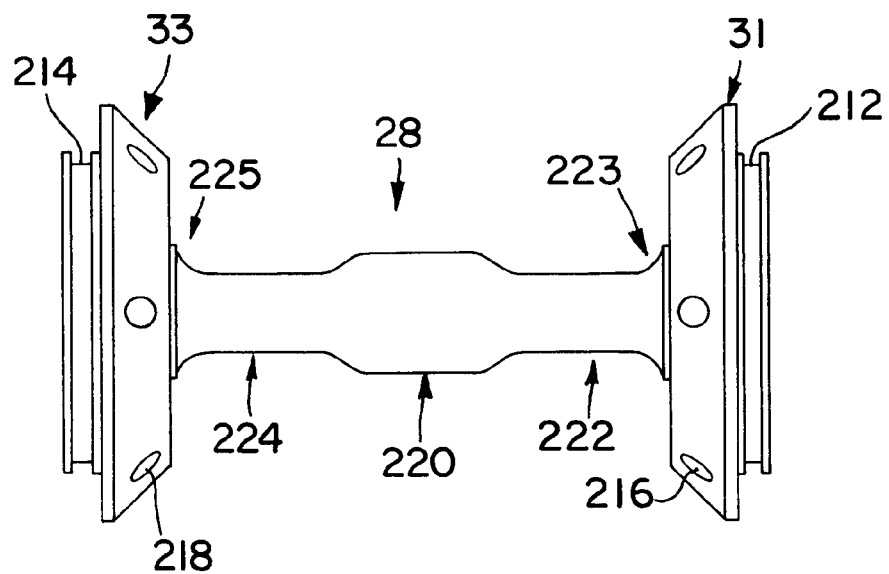
FIGS. 2A and 2B are schematic side and cross-sectional views of two of the end caps and one of the connectors of FIG. 1.

This invention may be accomplished by an apparatus having a plurality of axially contoured module shells carrying instrumentation to allow conduits such as tubes or piping with tight radius bends to be inspected. The apparatus allows multiple inspection, signal processing, data manipulation, data storage and power modules to be connected and propelled freely through the piping system including radiant and convective sections using a fluid such as nitrogen or air (gases) or water (liquid).

The apparatus preferably includes at least first, second, and third module shells, each shell having a rounded exterior and having a length that is 1.0 to 2.4 times its outer shell diameter. A first flexible, non-jointed intermodule connector joins the first and second shells, a second flexible intermodule connector joins the second and third shells, and each connector has a length that is 0.5 to 2.0 times the outer module shell diameter of the shells to which it is attached.

More preferably, each shell has a length that is 1.25 to 2.0 times its outer shell diameter, and each connector has a length that is 0.75 to 1.5 times the outer module shell diameter of the shells to which it is attached. Each connector preferably includes an outer polymeric member and an inner wear sheath or sleeve.

The invention allows various inspection modules to be connected and propelled through a serpentine coil. These inspection modules can be connected to battery modules and data processing and data storage modules. In this manner any number of inspection techniques can be utilized to measure tube condition. Data can now be gathered on all areas in the tubes. This can be done without the construction of scaffolding. The apparatus can be pushed through a section of tubes in a matter of minutes. The number of modules utilized depends on the number of measurement functions to be performed and the required packaging needed to obtain this information.

One construction of an inspection apparatus 10 according to the present invention is shown in FIG. 1 having modules 12, 14, 16, 18, 20 and 22 having centering rings or collars 50–52, 54, 56–58, 60–62, 64–68, and 70–72, respectively. Module 14 only has one centering ring 54 and sensing wheels 40 together with centering brushes 41. These modules are joined by flexible connectors 24, 26, 28, 30 and 32. Resilient polymeric noses 27, 29 on modules 12, 22, respectively, act as protective "bumpers" during travel of apparatus in either direction.

Figure 2B:
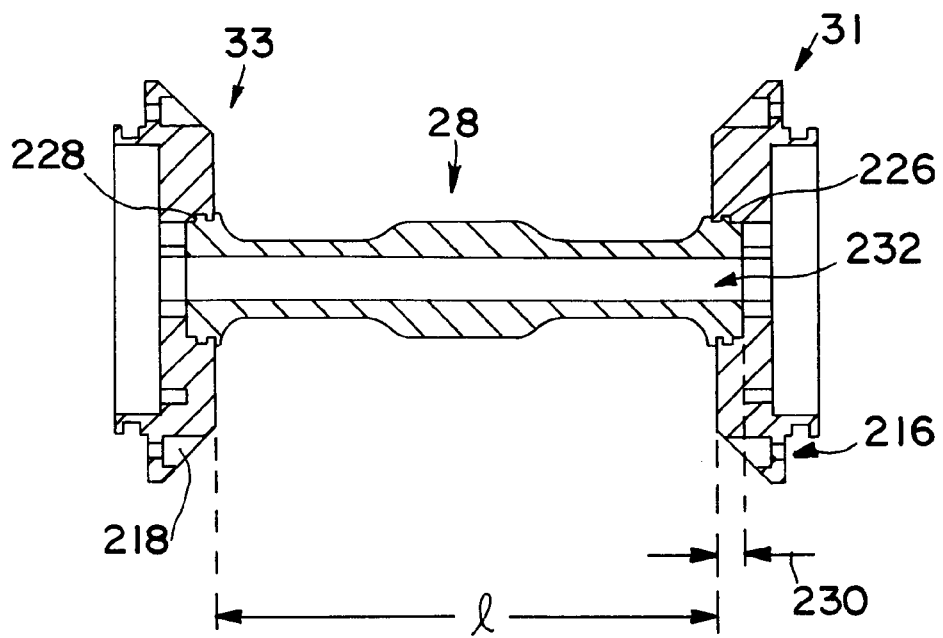

It is preferable for the apparatus 10 to carry instrumentation for measuring at least the internal diameter of a pipe 34, shown in phantom, the position of the apparatus 10 along the pipe 34, and the wall thickness of the pipe 34. In one embodiment laser optic triangulation within module 22 is used to measure internal diameter of the pipe; center section 23 is formed of optically clear polycarbonate to transmit laser beams. Ultrasonics within module 18 measures the wall thickness of the pipe; ultrasonic transducers 19 transmit and receive ultrasonic pulses. A rolling wheel 40 with transducers 42 within module 14 measures location along the pipe. Additionally, to indicate the orientation in the pipe we chose to utilize yaw, pitch and roll encoders in module 14. With the addition of the required digital signal processing and power in modules 16 and 20, the packaging of the initial device consists of six modules equipped with centering rings and joined together with intermodule connector tubes as shown in FIGS. 2A and 2B.

The length L of the modules, such as module 12, are chosen to optimize the volume available for components inside. The length L of the module to its outer shell diameter D ratio (L/D) of these modules preferably is contained within certain limits. The outer shell diameter D preferably is slightly smaller than the inside diameter of the pipe to be inspected. Too long of a module will result in the module not passing through the 1.0 radius bends often found in a fired heater. Too short of a module will result in the module cocking sideways in the pipe. Most preferably modules all have a L/D ratio of about 1.7.

A radius bend of a pipe 76 is illustrated in FIG. 1A relative to centerline 77. The centerline radius r of the bend of pipe 76 is a multiple of the nominal pipe diameter d, as that term is used in the American National Standards Institute (ANSI) Sections B36.10 and B36.19. For nominal pipe diameters greater than 12 inches, the nominal pipe diameter is equal to the outer diameter of pipes conforming to ANSI Schedule 40. Nominal pipe diameters equal to or less than 12 inches correspond approximately to the inner diameter of Schedule 40 pipes such as shown in FIG. 1A.

A pipe having a 1.5 bend has a centerline radius r that is 1.5 times the nominal pipe diameter d. For example, if pipe 76 were a four inch Schedule 40 pipe, it would have a nominal diameter d of 4 inches, corresponding approximately to its inner diameter, and would have a radius r of the curvature of the centerline 77 of 6 inches. Typically, the curvature of centerline 77 matches the outer curve of pipe interior surface 75 and the inner curve of pipe interior surface 74. Preferably, the outer module shell diameter is nearly as large as the inner pipe diameter to maximize internal volume within the module shell. The nominal pipe diameter d can then closely correspond to the outer module shell diameter.

The intermodule connector 28 is also illustrated in more detail in FIGS. 2A and 2B. The intermodule connectors act as a conduit for the various wiring that must pass between modules and serve as the physical connector to hold the apparatus together. The inner module connector must be stiff enough to resist the tension and compressive force exerted as the apparatus flows through the furnace. Yet it must also be flexible enough to bend. It must also be leak tight under pressure to prevent water from entering the apparatus and damaging the electronics.

Connector 28 flexibly interconnects end caps 31, 33 and their respective modules 16, 18. End caps 31, 33 have O-ring grooves 212, 214 and bolt passages 216, 218. Connector 28 has an enlarged center section 220 narrow sections 222, 224.

This configuration enables connector 28 to handle higher compressive loads without buckling yet still achieve high flexure as needed to negotiate tight radius pipe pends. Connector 28 preferably defines shoulders 223, 225 to further resist compressive loads.

Connector 28 is preferably formed of polyurethane integrally molded into end caps 31, 33 as illustrated in cross-section in FIG. 2B. Steps or grooves 226, 228 within end caps 31, 33 provide an irregular surface to enable interlocking of connector 28 with end caps 31, 33. The depth of penetration of connector 28 into end cap 31 is indicated by arrow 230. Connector 28 has an effective length l to maintain a desired spacing between modules 16, 18, FIG. 1.

Figure 5:
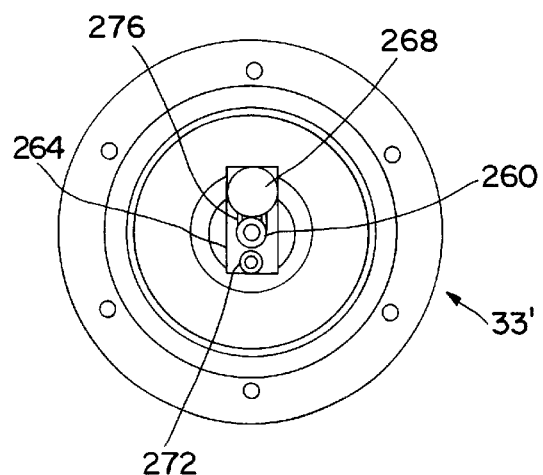
FIG. 5 is a schematic end view of a tension element and bracket attached to an end cap for maintaining the desired spacing of the module shells.

In a preferred construction, connector 28 carries a replaceable inner sleeve (not shown) within passage 232. The sleeve preferably is formed of a low-friction material such as Teflon polymer which reduces wear on the inner surface of connector 28 by electrical cables and tension elements such as shown in FIG. 5, described below.

The length-to-shell diameter ratios may be adjusted to present the optimum packaging of different inspection components. The L/D ratio preferably is maintained in a rather narrow preferred range of 1.0 to 2.4. The L/D ratio has a more preferred range of 1.25 to 2.0. Too low of an L/D ratio will result in a module that will tend to turn sideways within the pipe. Too high of an L/D ratio will result in a module that will physically stick within the tight radius pipe bends.

The inventors have recognized that there are practical limits on the length l of this connector as a function of the pipe diameter. Too long of a connector results in the connector buckling and taking an S shape. In other words, too high of an l/D ratio will result in the intermodule connectors buckling, especially as they travel a straight section of pipe. Too low of an l/D ratio will result in the modules interfering with each other as they pass through the tight radius bends, that is, too short of a connector will result in the modules colliding as they go around a bend. The most preferred apparatus has connectors with a length-to-shell ratio of about 1.02. The l/D ratio of the connector preferably is maintained in a rather narrow range of 0.5 to 2.0. The more preferred range of l/D is 0.75 to 1.5.

Figure 3:
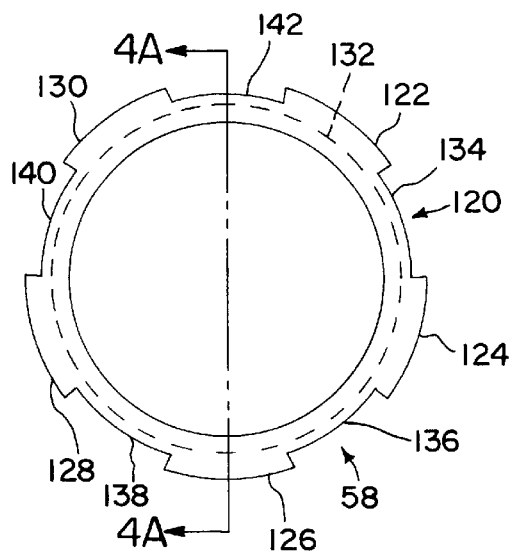
FIG. 3 is a schematic side view of one of the centering rings shown in FIG. 1.

Centering ring 58 is illustrated in end view in FIG. 3. The centering rings go over the module shell and act to keep the modules centered in the pipe and parallel to the center line of the pipe. The rings must be resilient enough to allow the modules to flow over obstructions and to deform through bends yet stiff enough to keep the module centered. Module 16 utilizes centering ring base 120 machined out of high density polyethylene (HDPE) with projections 122, 124, 126, 128, 130 molded into the ring 58 to result in an outside diameter similar to the nominal inside diameter of the pipe being inspected. The projections are separated by depressions or valleys 134, 136, 138, 140, 142 with milled openings through which nylon brushes protrude for centering rings 58, 60, 62 and 64 to further assist centering of ultrasonic module 18 within a conduit.

Figure 4:
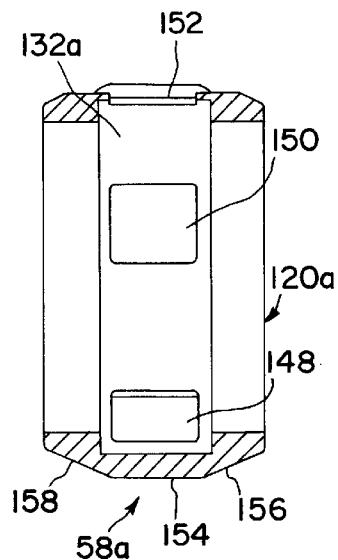
FIG. 4 is a cross-sectional view along line 4—4 of FIG. 3 showing brush inserts after installation in the ring.

The inside of a portion of ring 58 is shown in FIG. 4 after centering brushes are installed. Brush bases 148, 150, 152 anchor the brush inserts and lie within groove 132. The outer surface of the ring or collar 58 defines an upper land 154 and slopes 156, 158 to provide an axially contoured exterior for module 16.

Figure 6:
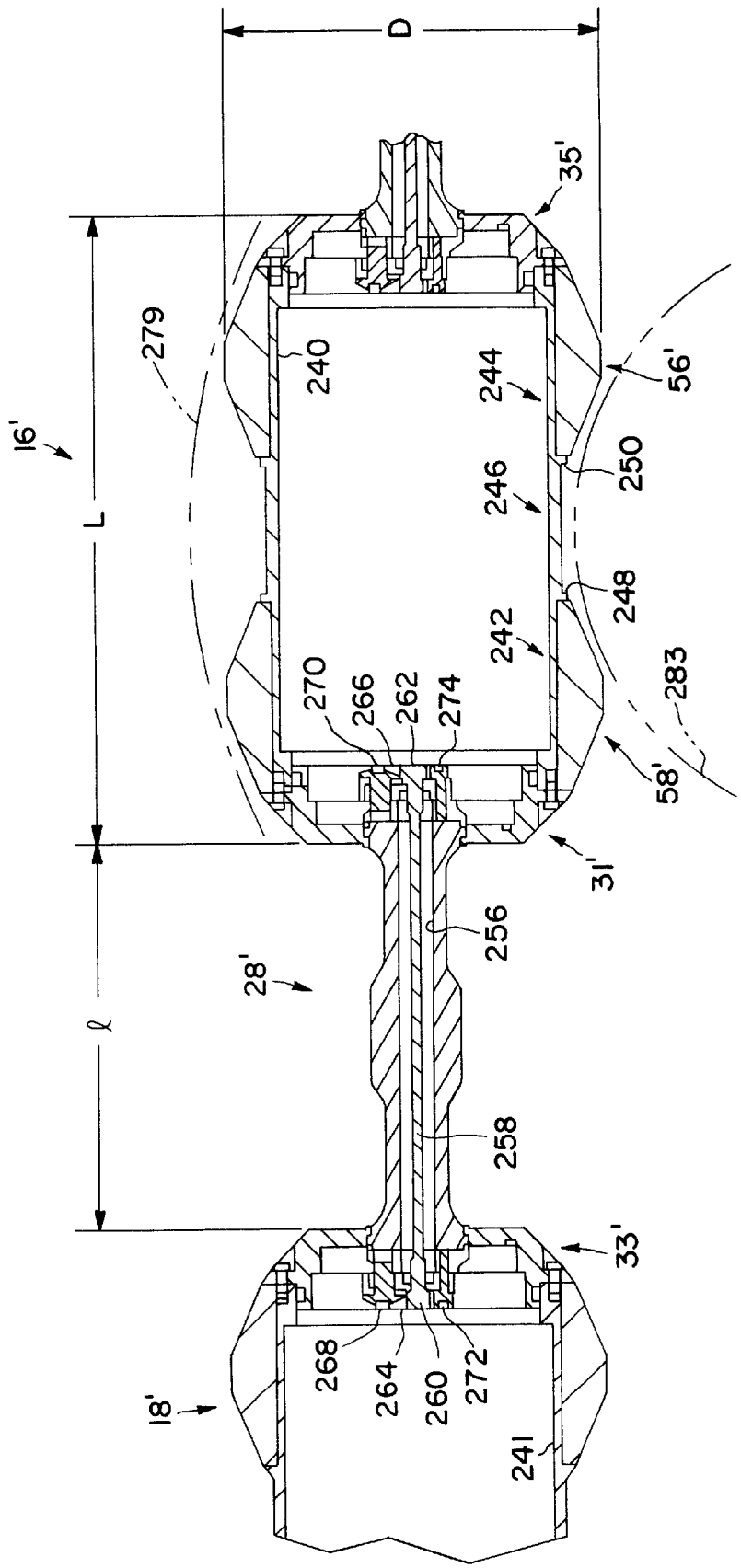
FIG. 6 is a schematic cross-sectional view showing the tension element of FIG. 5 installed within a connector.

In one construction, FIG. 6, the module casing 240 is machined at either end to have reduced-diameter portions 242, 244 over which the centering rings are slid during assembly. The center full-diameter portion 246 defines shoulders 248, 250 to catch the inner edges of the rings 56', 58' while the outer edges of the rings mate against end caps 31', 35'. By comparison module 12, FIG. 1, has a collar 39, which secures into a modified end cap 37 to provide easier access to a battery component.

A tension element 256 is shown in FIGS. 5 and 6. The tension element 256 comprises a cable 258 disposed within a passage 232' and ball-and-shank swage fittings 260, 262 which releasably interlock with brackets 264, 266. Each bracket 264, 266 defines a "key-hole" circle and slot opening: the circle portion is sufficiently large to pass the ball portion of fittings 260, 262 therethrough; the slot portion slideably receives the shank portion but retains the ball portion.

In one construction, cable 258 is a high-strength aircraft cable formed of twisted stainless steel wires. The ball-and-shank swage fittings, such as available from University Swaging of Seattle, Wash., are fitted to the ends of the cable using a press machine.

Brackets 264, 266 are secured to end caps 33', 31' by large-headed bolts 268, 270 and small-headed bolts 272, 274. The head of bolt 268 resists lateral movement of the ball portion 260 along slot 276 toward the circle portion of the opening, as shown best in FIG. 5. Electrical cables (not shown) are routed to either side of bracket 264.

In this construction, the connector 28' is formed of a urethane polymer that has sufficient flexibility and resists compression, but lacks strength to resist tension forces. Tension element 256 distributes tension or strain forces to metal canisters 240, 241 through brackets 264, 266.

Figure 7:
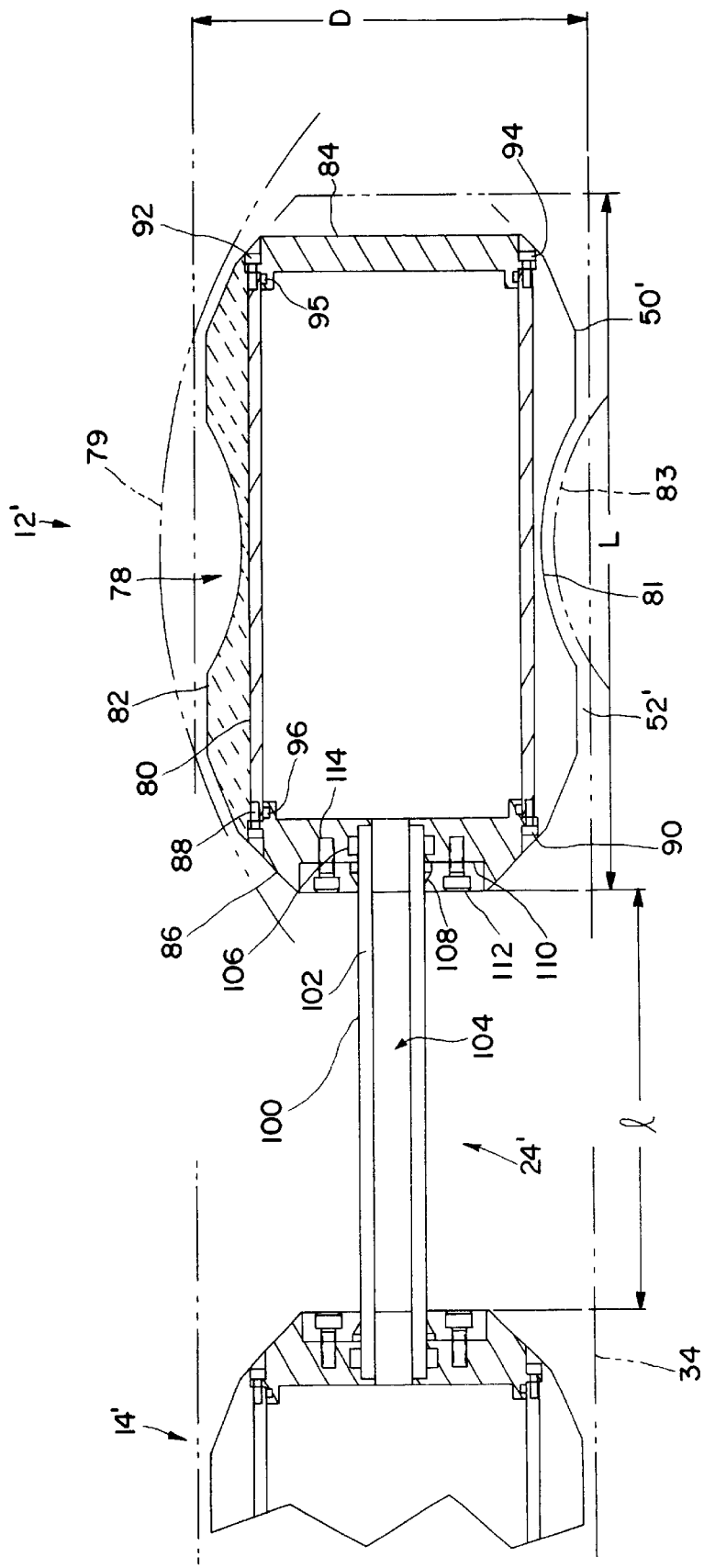
FIG. 7 is a schematic cross-sectional view of an alternative embodiment of the invention.

In another construction shown in FIG. 7, module 12' has an outer shell 78 formed of a cylindrical case 80 made of aluminum and a jacket 82 made of high or ultra-high molecular weight polyethylene. The jacket 82 conforms to an arc 79 and includes a saddle depression 81 defining an arc 83. Arc 79 approximates the outer curve of surface 75, FIG. 1A, of a tight radius pipe bend and arc 83 approximates the inner curve 74 of the pipe bend. Preferably, arcs 79, 83 correspond to a radius bend less than 2.0, more preferably less than 1.5 and most preferably about 1.0. Similar arcs 279, 283 are illustrated in FIG. 6.

An end cap 84, FIG. 7, made of aluminum with a resilient polyethylene nose (not shown) is attached to the case 80 by stainless steel bolts 92, 94 while cap 86 is secured to case 80 by bolts 88, 90. End caps 84, 86 are sealed by O-rings 95, 96 and are held in place by bolts 92, 94 and 88, 90 respectively.

In the construction shown in FIG. 7, the connector 24 has a molded urethane connector sheath 100 with a molded-in stiffener 102 defining an internal passage 104 to allow electrical wires or fiber optic cables to pass from module to module. The outer sheath 100 is sealed against cap 86 by O-ring 106 and by collar 108 with plate 110 held by bolts 112, 114.

There are a variety of inspection methods that could be utilized with this basic transportation system. There are a number of known methods for measuring the inside diameter of the pipe. These techniques include, but are not limited to, the laser optic method, internal calipers and ultrasonics. Internal calipers are simply arms that ride along the inside of the pipe. The displacement of these arms are measured to measure the inside diameter. An ultrasonic sound wave traveling through a fluid will strike the inner wall of the pipe and part of this energy will be reflected back. By measuring the time that it takes for this round trip through the fluid, one can calculate the distance of the transducer from the wall.

There are also a number of known methods for measuring the wall thickness of the pipe. These techniques include, but are not limited to, the ultrasonic method mentioned above and magnetic flux leakage. The magnetic flux leakage system uses powerful magnetics to induce the magnetic field in the pipe. Sensors then sense any flux leakage within the magnetic field to measure wall thickness and detect wall anomalies. This same basic transportation system could be used with only one measurement system, or with additional measurement techniques to examine other parameters of interest.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A conduit inspection apparatus comprising:
   at least first and second fluid propelled module shells, each fluid propelled module shell for propelling the module shell through a conduit and having an axially contoured exterior and a length that is 1.0 to 2.4 times its outer shell diameter and the length being transverse to the diameter, the contoured exterior having a saddle depression for negotiating a bend radius of the conduit that is less than twice as large as the outer shell diameter of each fluid propelled module shell; and
   a flexible intermodule connector joining the first and second shells, the connector having a length that is 0.5 to 2.0 times the outer shell diameter of each fluid propelled module shell and the apparatus is sufficiently contoured and flexible to negotiate a bend radius of the conduit that is less than twice as large as the outer shell diameter of each fluid propelled module shell.

2. The apparatus of claim 1 wherein the saddle depression has an arc shape that conforms to the bend radius of a pipe.

3. A conduit inspection apparatus comprising:
   at least first, second, and third fluid propelled shells, each fluid propelled module shell for propelling the module shell through a conduit and having an axially contoured exterior and having a length that is 1.0 to 2.4 times its outer shell diameter and the length being transverse to the diameter, the contoured exterior having a saddle depression for negotiating a bend radius of the conduit that is less than twice as large as the outer shell diameter of each fluid propelled module shell; and
   a first flexible, non-jointed intermodule connector joining the first and second fluid propelled module shells, a second flexible intermodule connector joining the second and third shells, and each connector having a length that is 0.5 to 2.0 times the outer shell diameter of the fluid propelled module shells and the apparatus is sufficiently contoured and flexible to negotiate a bend radius of the conduit that is less than twice as large as the outer shell diameter of each fluid propelled module shell.

4. The apparatus of claim 3 wherein each module shell has a length that is 1.25 to 2.0 times its outer shell diameter.

5. The apparatus of claim 4 wherein each connector has a length that is 0.75 to 1.5 times the outer shell diameter of the module shells to which it is attached.

6. The apparatus of claim 5 wherein each connector includes an inner wear sheath.

7. The apparatus of claim 5 wherein the apparatus is sufficiently contoured and flexible to negotiate a bend radius of a conduit that is less than 1.5 times as large as the outer module shell diameter of each module shell.

8. The apparatus of claim 3 wherein the axially contoured exterior of each shell is established at least in part by at least one contoured centering ring mounted on each module shell.

9. The apparatus of claim 8 wherein each module shell carries at least two removable contoured centering rings.

10. The apparatus of claim 3 wherein each connector includes a tension element secured to the shell to which that connector is attached.

11. The apparatus of claim 3 wherein each of said first and second connectors is integrally molded to an end cap which is part of a respective module shell.

12. The apparatus of claim 11 wherein each of said end caps is removably secured to its respective module shell.

13. The apparatus of claim 3 wherein the saddle depression has an arc shape that conforms to the bend radius of a pipe.

14. A conduit inspection apparatus comprising:
   at least first and second fluid propelled module shells, each fluid propelled module shell for propelling the module shell through a conduit and having an axially contoured exterior and an outer shell diameter, the contoured exterior having a saddle depression for negotiating a bend radius of the conduit that is less than twice as large as the outer shell diameter of each fluid propelled module shell; and
   a flexible intermodule connector joining the first and second shells, and the apparatus is sufficiently contoured and flexible to negotiate a bend radius of the conduit that is less than twice as large as the outer shell diameter of each fluid propelled module shell.

15. The apparatus of claim 14 wherein each connector includes an inner wear sheath.

16. The apparatus of claim 14 wherein the apparatus is sufficiently contoured and flexible to negotiate a bend radius of a conduit that is less than 1.5 times as large as the outer shell diameter of each module shell.

17. The apparatus of claim 14 wherein the axially contoured exterior is established at least in part by at least one contoured centering ring mounted on each module shell.

18. The apparatus of claim 17 wherein each module shell carries at least two removable contoured centering rings.

19. The apparatus of claim 14 wherein each connector includes a tension element secured to the shell to which the connector is attached.

20. The apparatus of claim 14 wherein each of said first and second connectors is integrally molded to an end cap which is part of a respective module shell.

21. The apparatus of claim 20 wherein each of said end caps is removably secured to its respective module shell.

22. The apparatus of claim 20 wherein the saddle depression has an arc shape that conforms to the bend radius of a pipe.

23. A conduit inspection apparatus comprising:
   at least first, second, and third fluid propelled shells, each fluid propelled module shell for propelling the module shell through a conduit and having an axially contoured exterior and an outer shell diameter, the contoured exterior having a saddle depression for negotiating a bend radius of the conduit that is less than twice as large as the outer shell diameter of each fluid propelled module shell; and
   a first flexible, non-jointed intermodule connector joining the first and second fluid propelled module shells, a second flexible intermodule connector joining the second and third shells, and the apparatus is sufficiently contoured and flexible to negotiate a bend radius of the conduit that is less than twice as large as the outer shell diameter of each fluid propelled module shell.

24. The apparatus of claim 23 wherein the apparatus is sufficiently contoured and flexible to negotiate a bend radius of a conduit that is less than 1.5 times as large as the outer shell diameter of each module shell.

25. The apparatus of claim 23 wherein the axially contoured exterior is established at least in part by at least one contoured centering ring mounted on each module shell.

26. The apparatus of claim 25 wherein each module shell carries at least two removable contoured centering rings.

27. The apparatus of claim 23 wherein each connector includes a tension element secured to the shell to which the connector is attached.

28. The apparatus of claim 23 wherein each of said first and second connectors is integrally molded to an end cap which is part of a respective module shell.

29. The apparatus of claim 28 wherein each of said end caps is removably secured to its respective module shell.

30. The apparatus of claim 23 wherein the saddle depression has an arc shape that conforms to the bend radius of a pipe.

\* \* \* \* \*